United States Patent Office 2,969,671
Patented Jan. 31, 1961

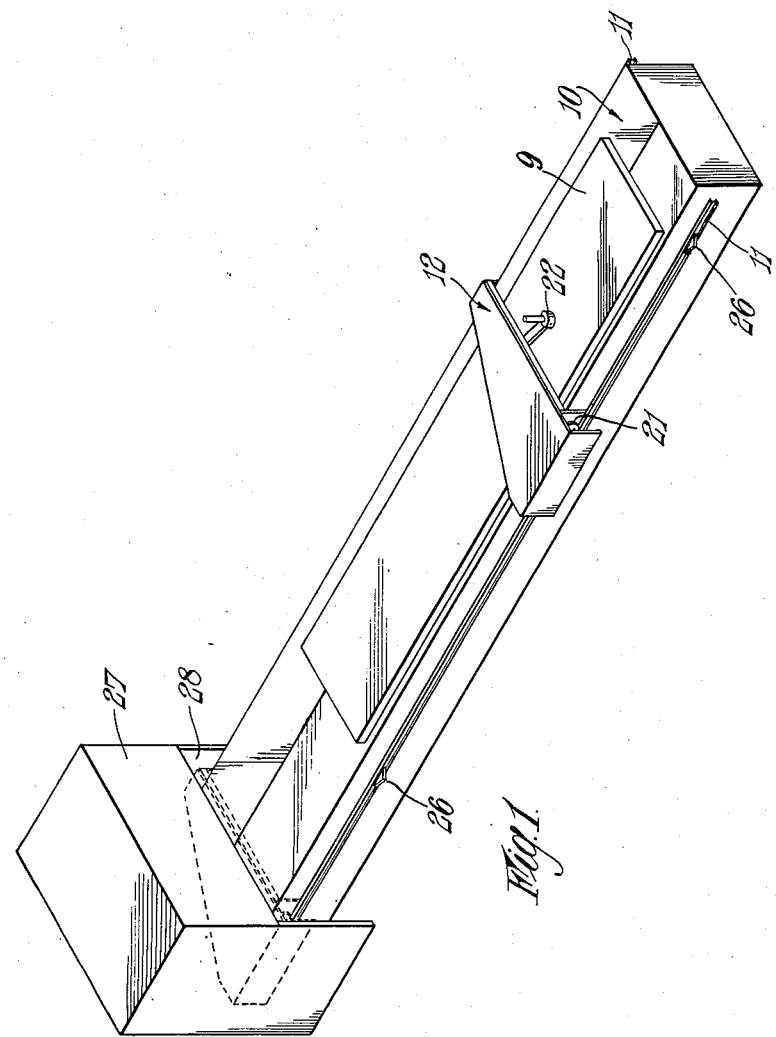

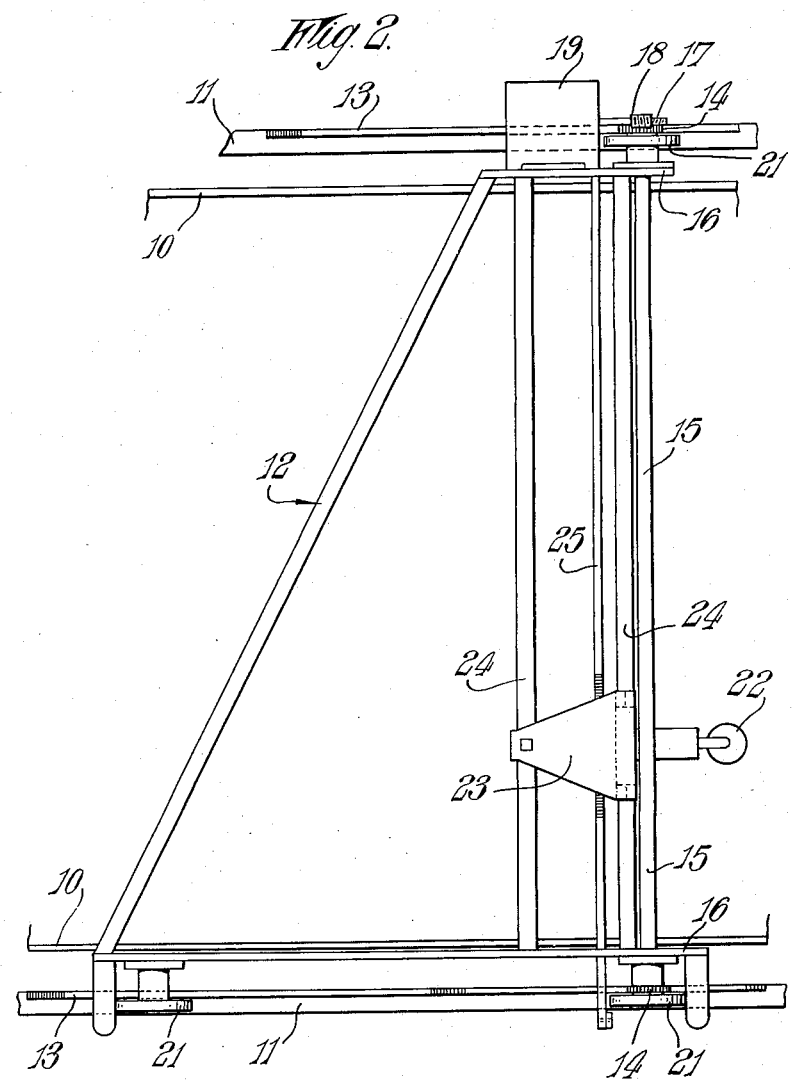

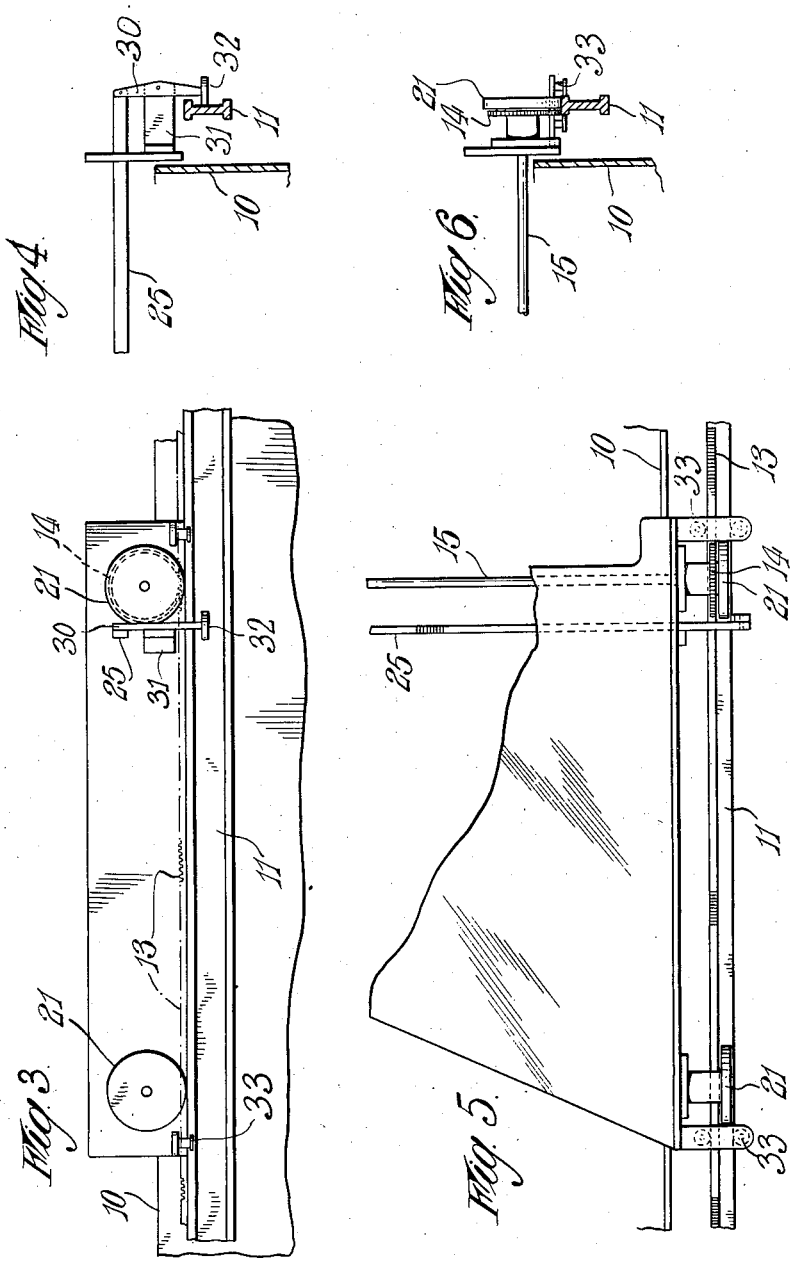

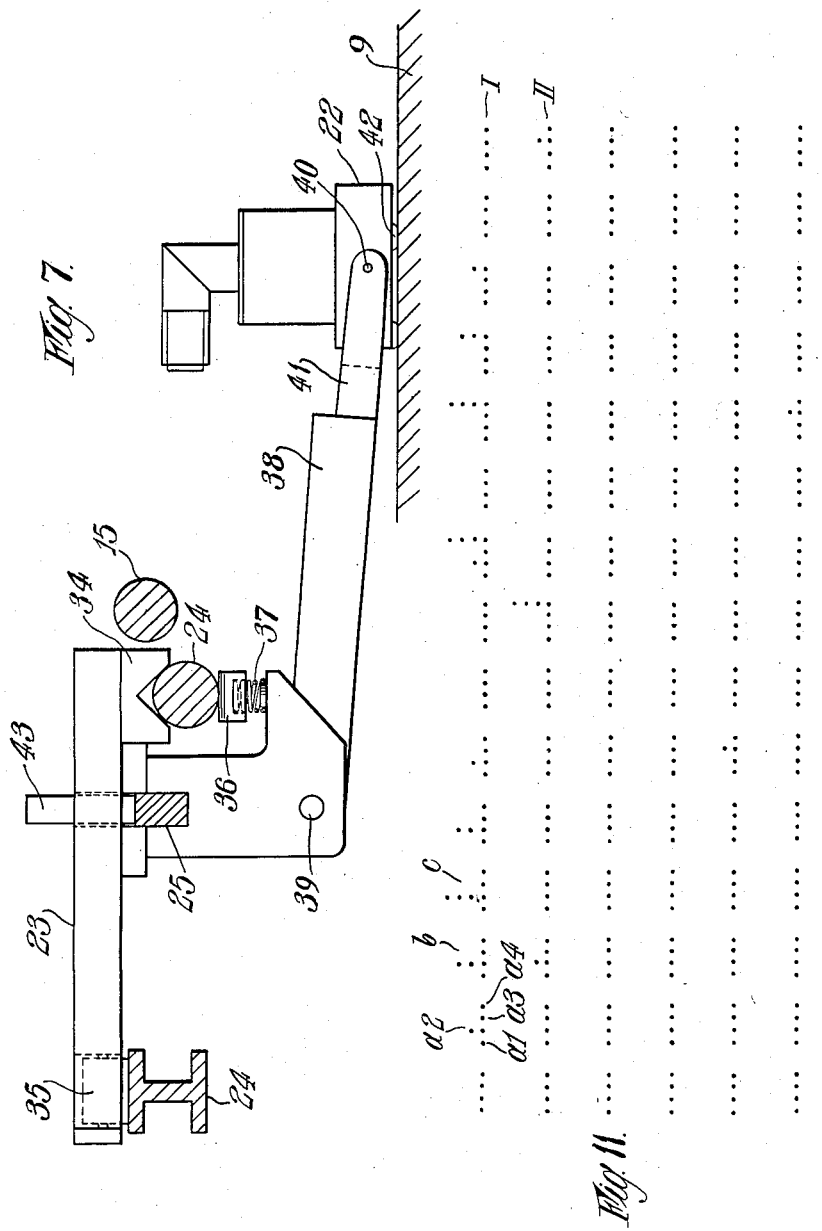

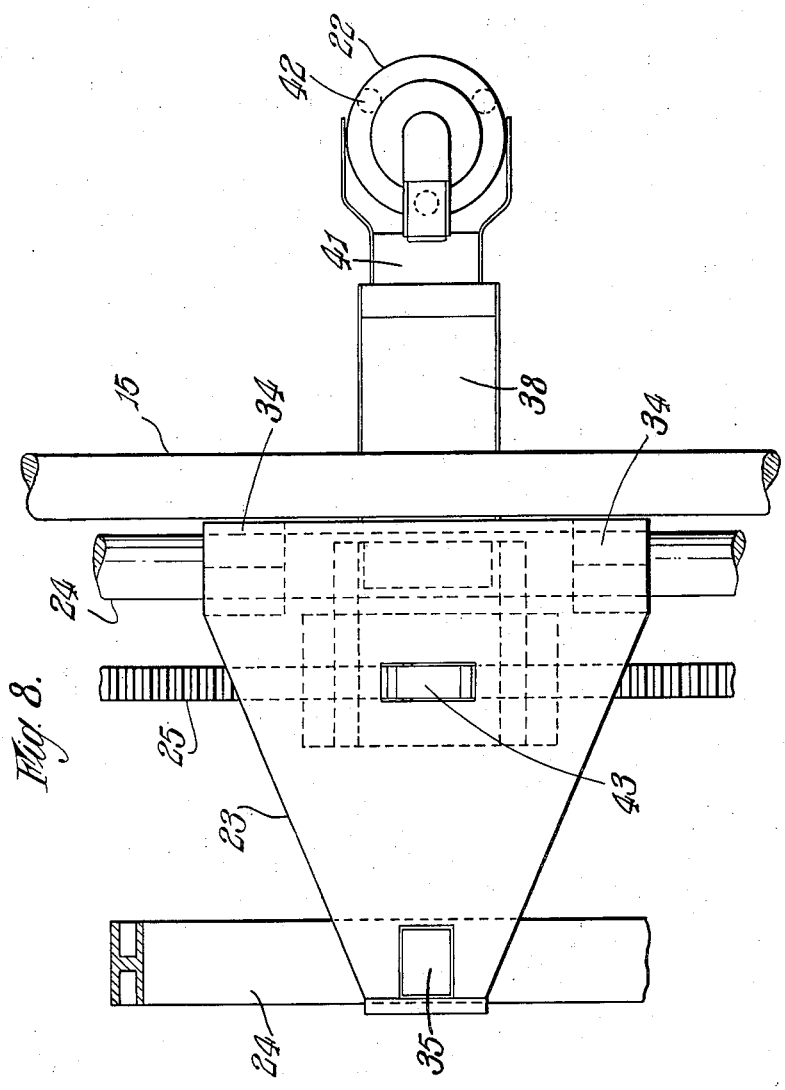

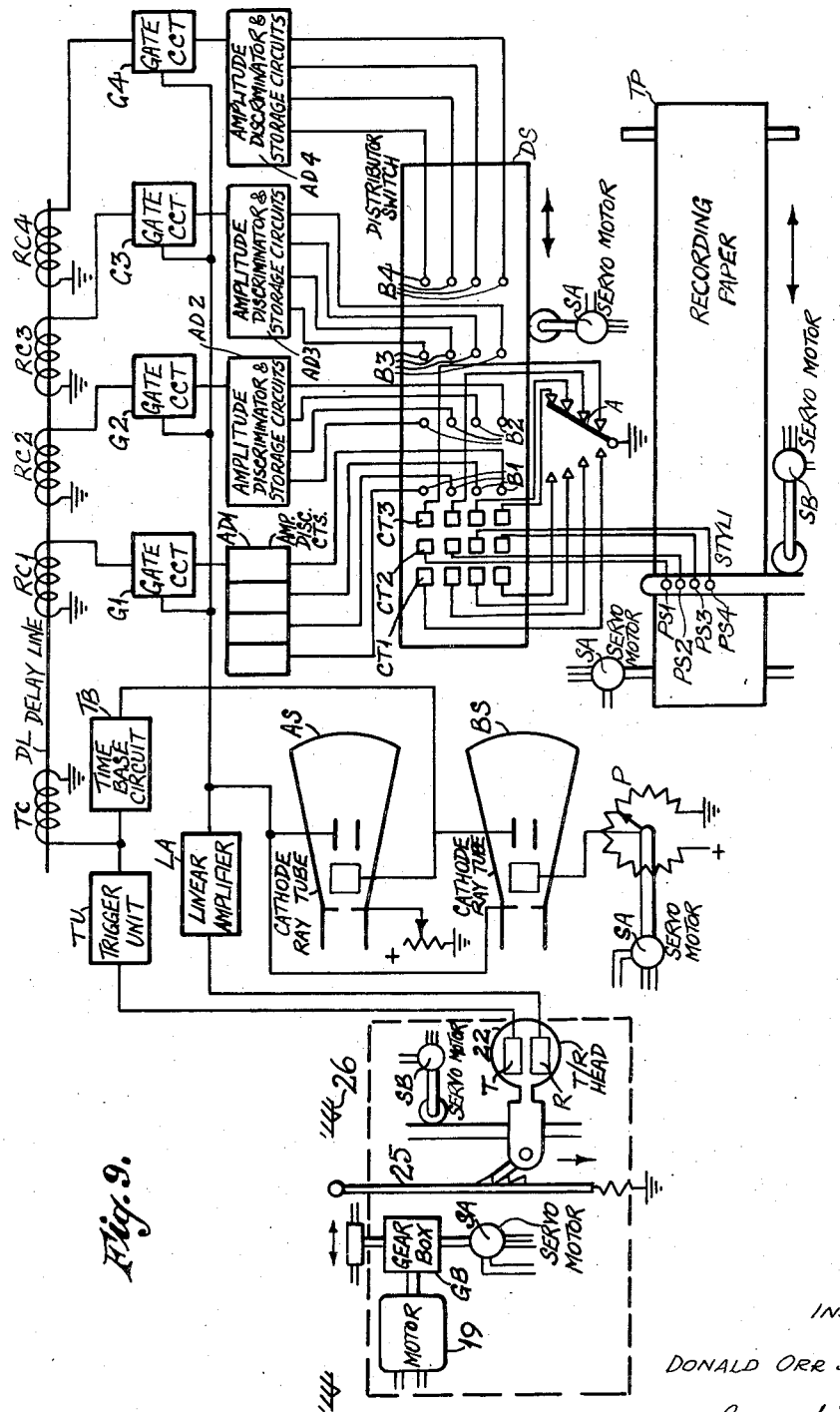

2,969,671

ULTRASONIC FLAW DETECTING APPARATUS

Donald Orr Sproule, London, England, assignor to Glass Developments Limited, London, England, a British company Filed Feb. 7, 1957, Ser. No. 638,719

Claims priority, application Great Britain Feb. 10, 1956

8 Claims. (Cl. 73—67.9)

The present invention relates to apparatus for the detection of flaws in solid objects such as metal sheets, billets and forgings by the use of echo technique employing ultrasonic sound waves in a manner which is now well known.

The main object of the invention is the provision of an apparatus for permitting the testing of comparatively large objects to be effected at high speed with means for recording the position and intensity of echoes which would indicate imperfections in the specimen. For this purpose use has already been made of oscilloscopes which give a particular form of trace indicating the presence of flaws but which produce no permanent record. It is a feature of the present invention that oscilloscopes involving two different methods of presentation of the information may be incorporated with the equipment for giving a permanent record. Moreover it is intended that the operation once started shall proceed automatically so that the operator is free to give his whole attention to the study of the indications where some effort of interpretation is necessary.

According to the invention a probe incorporating a transmitter and receiver or a combined transmitting and receiving unit is arranged to be automatically traversed backwards and forwards over the face of the specimen under test so as to deal in turn with a number of narrow strips and pulses are fed to the transmitter at a suitable rate and indications of the echoes obtained are stored as electrical signals and arranged in due course to operate the recording equipment which may incorporate means for giving different markings in accordance with the intensity of the echo. The invention offers considerable advantages as regards the saving of time since by its use data relating to echoes from a number of depth zones may be extracted on the same traverse and owing to the storage arrangements, these data can then be recorded without requiring an uneconomical and perhaps prohibitively high speed of the recording device.

The invention will be better understood from the following description of a preferred manner of carrying it into effect which should be taken in conjunction with the accompanying drawings comprising Figures 1 to 11. In these drawings Fig. 1 is a perspective view indicating the general layout of the arrangements for moving the probe over the test object.

Figure 2 is a plan view on a larger scale of the movable scanning unit shown in Fig. 1, the cover being removed to show the details more clearly.

Figures 3–6 show details of the mounting and driving arrangements and particularly those for securing the necessary transverse action, Figures 3 and 5 being a side elevation and a plan respectively, while Figure 4 is a part sectional view showing the rack driving arrangement and Figure 6 is a similar view of the main longitudinal drive.

Figures 7 and 8 are side and plan views of the probe mounting assembly, indicating also further details of the ratchet mechanism.

Figure 9 is a block schematic showing generally the interconnection of the various circuits.

Figure 11 is a specimen of the record obtained.

Figure 10:
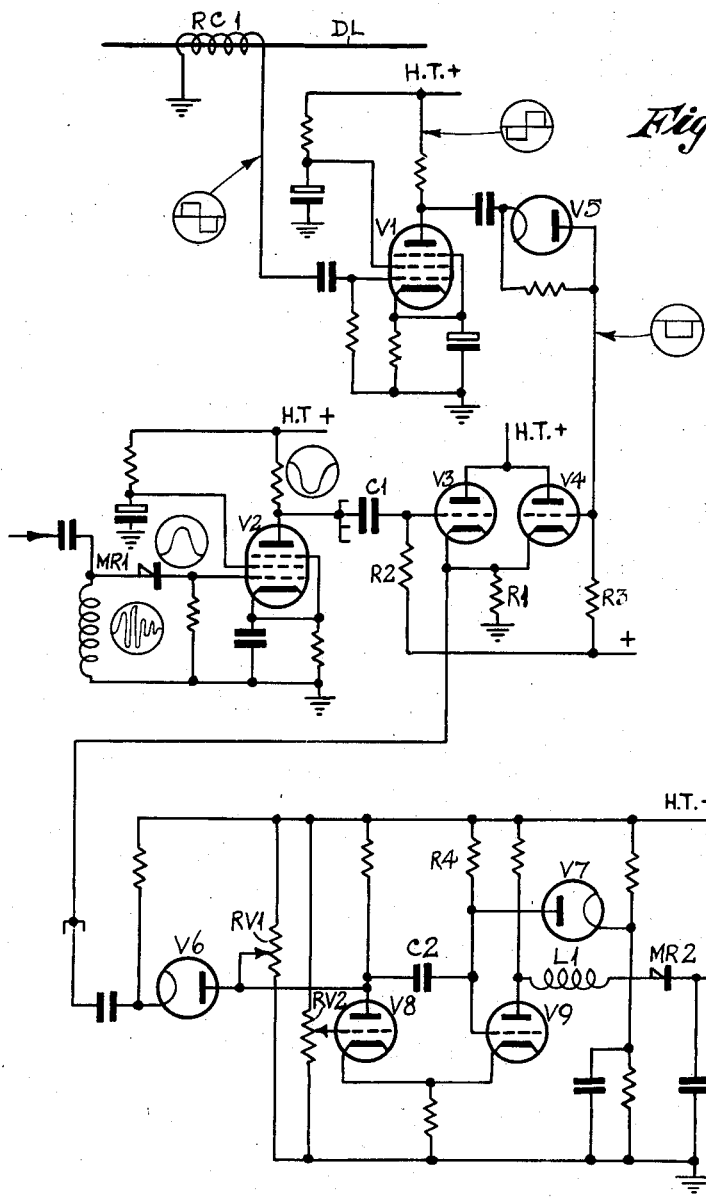
Figure 10 is a circuit diagram of the equipment for obtaining the record.

Referring first to Figures 1 and 2, a test object 9, for instance, an aluminium plate of 3 to 6 inches thickness is supported in a tank 10 of suitable size and shape, which is filled with water or other suitable liquid to a depth sufficient to cover the spicemen. Along the sides of the tank are mounted horizontal rails 11 for supporting a movable trolley 12. As may be seen more clearly from the detailed figures, each side rail 11 carries on its upper surface a rack 13 which is engaged by a gear wheel 14, the two gear wheels on opposite sides of the tank being secured to a transverse shaft 15 journalled in the trolley framework 16. A worm wheel 17 also secured to the shaft 15 is in driving engagement with a worm 18 mounted on the spindle of a reversible electric motor 19 carried by the trolley framework. The framework 16 is of generally triangular shape providing a three-point suspension through rollers 21 running on the side rails 11.

A probe or scanning head structure 22 carried upon a probe mount 23 is movable transversely of the tank on guides 24, the movement being effected by a reciprocable rack bar 25 carrying ratchet teeth and arranged to co-operate with a pawl on the probe mount 23. The reciprocation of the bar 25 over a distance of, for instance, a quarter of an inch, is effected by the engagement of a rocker arm with one or other of two adjustable ramps 26 secured to the outer surface of one of the rails 11 at positions where reversal of the longitudinal movement is required, that is to say, adjacent the ends of the test object.

As already mentioned, the test object is preferably covered by a suitable liquid which acts as a coupler between the probe and the object to permit the injection of the ultrasonic pulses. As will be described in greater detail in connection with Figs. 7 and 8, the probe head structure 22 is mounted on a form of universal joint and is arranged to have three-point contact with the upper surface of the test object. This ensures that the angle of the probe relative to the surface of the object remains constant.

When a test is to start, the carriage and the probe mount thereon are adjusted so that the probe structure is located at one corner of the test object. The motor is then switched on and causes a traverse of the trolley to the other end of the object whereupon, when the ramp 26 at the opposite end is engaged by the rocker arm, the probe mount is moved one step in the transverse direction and the motor is reversed. Consequently, another traverse is initiated over an adjacent strip of the object and the process is repeated, the trolley moving backwards and forwards with the probe moved one step after each traverse until the whole of the object has been covered.

As may be seen from Fig. 1, the end of the tank is provided with a casing 27 which may accommodate the control and recording equipment and also serves to provide a protective compartment 28 into which the trolley can be pushed by hand while the test object is being placed in or removed from the tank.

It will be appreciated that for convenient presentation, portions of the recording equipment are required to perform movements related to those of the probe head and in a small embodiment of the apparatus, the recording equipment might actually be mounted on the trolley. In the more general case, however, it is preferred that the recording equipment should be mounted separately and in this case some form of linkage must be provided to ensure that the movements of the recording equipment reproduce those of the trolley. This could be effected mechanically by some form of pantograph arrangement but preferably use is made of electrically controlled follow-up or servo mechanism, for instance, of the type commonly known as Selsyns. With an electrical interconnection of this type, there is very little limitation on the location of the recording equipment and, if desired, records can be made simultaneously in more than one place.

Referring now more specifically to Figs. 3–6 which show the driving arrangements in greater detail, it will be seen that the controlling rocker arm 30 is supported from the end of the trolley by a bracket 31. One end of the rocker arm carries a roller 32 adapted to engage with one of the projections 26 and when this occurs, the ratchet bar 25 is moved to the left in Fig. 4 and when the motor reverses, so that the roller 32 disengages the ramp 26, the bar 25 is restored by a spring, not shown in these figures. Figs. 3, 5 and 6 also indicate the rollers 33 by means of which the trolley is guided along the rails 11.

Referring now to Figs. 7 and 8, these show more clearly the probe mounting. The member 23 is substantially triangular in shape and underneath the ends of its side which extends transversely of the tank is provided with two V-shaped blocks 34 co-operating with the bar 24. At the other end the member 23 is provided with a roller 35 which engages with the surface of the left-hand member 24. The mount 23 is maintained in position by the shoe 36 which is loaded by the spring 37 and engages the underside of the bar 24. The probe supporting arm 38 is pivoted to the mount 23 at 39 and the weight of the probe maintains a suitable pressure between the probe and the test object. The probe head 22 is substantially circular in shape and is pivoted at 40 in a bifurcated support member 41 attached to the member 38 and hence capable of rotation about the pivot 39. The probe head is provided with three distance pieces 42 equally spaced around its circumference and these ensure that the probe is maintained parallel to the surface of the test object and a constant distance away. In order to enable the probe mount to be moved by hand in either direction transversely, a ratchet release lever 43 is provided.

Consideration will now be given to the block diagram, Fig. 9, indicating the general mechanical and electrical arrangements for producing the required recordings. The dotted rectangle on the left represents the movable trolley and it will be seen that it includes the motor 19 which, by means of suitable gearing, indicated generally by the gear-box GB, produces the longitudinal movement of the trolley. This diagram also shows the reciprocable rack bar 25 and the ramps 26 with which it engages at the end of its travel, thereby changing over a switch to reverse the motor and stepping the probe mount one tooth so as to bring about the traverse of the succeeding strip on the test object. The necessary pulses of supersonic frequency are produced from the trigger unit TU which serves to produce short pulses, for instance, at a frequency of the order of 2 mc./s. and a repetition frequency of 50 c./s. These pulses are fed to the transmitter T which incorporates an electro-acoustic transducer element for instance a suitable crystal of quartz or barium titanate, from which by known technique, supersonic pulses are applied to the test object. These pulses then pass through the thickness of the object and are reflected at the lower boundary edge so that they return a predetermined time later to the receiver R which is located adjacent to the transmitter and may be of similar construction. If there should be any flaws in the test object, the supersonic waves will suffer some degree of scattering and reflection and will thus reach the receiver ahead of the main reflected wave after a time period which is an indication of the location of the flaw.

The pulses are also fed to a time base TB which is used for controlling the indications given by two monitor oscilloscopes AS and BS which are arranged to give so-called A-type and B-type presentations and also receive signals from the amplifier LA. The manner in which this is done and the information provided thereby will be dealt with subsequently.

The pulses also extend to a transmitting coil TC associated with a delay line DL which may be of the nickel magnetostriction type. The delay line DL is provided with four receiver coils RC1, RC2, RC3 and RC4 which are so dimensioned and located that, in accordance with the rate or propagation down the delay line, they introduce in their respective outputs the required delay for giving the desired recording characteristics. The coils RC1–RC4 control the gates G1–G4 respectively, to which is also fed the output from the linear amplifier LA associated with the receiver R. When the gates G1–G4 are open, they allow signals to pass to the amplitude discriminators AD1–AD4 respectively and these are arranged, in generally known manner, to operate storage devices such as capacitors in accordance with the amplitude of the signal which is allowed to pass through the gate.

In the arrangement disclosed, it is assumed that discrimination at four different output levels will give the information which is required and each output level has associated with it a suitable memory or storage circuit such as a capacitor charged through a rectifier so that, in accordance with the amplitude of the signal, a sustained output potential is provided on a particular plurality of the output leads.

These are connected to associated sets of fixed brushes B1–B4 on a distributor switch DS which for convenience of representation is shown in developed form i.e. as if unrolled flat but is assumed to comprise a rotatable cylindrical member of insulating material provided with three sets of metallic contacts CT1, CT2 and CT3. The contacts CT2 are connected to pens or styli PS1–PS4 which co-operate with a strip of recording paper TP. This may conveniently be Teledeltos paper which as is well known has the characteristic that when a suitable potential is applied thereto by means of a stylus, a black mark is produced. The switch DS is arranged to operate in one direction or the other dependent on the direction of traverse movement of the trolley, the follow-up movement being produced by the servo-mechanism. One set of contacts CT1 or CT3 is earthed during the operation of the distributor switch DS and changeover of the earth connection is effected in accordance with the direction of movement of the switch by means of the arm A which is reversed by a lost motion device when the direction of movement of the switch is reversed. The arrangement is such that the earthed set of contacts always engages the brushes extending from any one of the amplitude discriminators AD1–AD4 shortly after these brushes have engaged the contacts CT2. The stored potentials are then transferred to the pens PS1–PS4 and shortly thereafter the leads are earthed so as to discharge such capacitors as are charged.

Movements corresponding to the movement of the trolley are communicated to the recording equipment by means of the servo-mechanisms SA and SB, SA dealing with the longitudinal movement and SB with the transverse movement. It will be seen that a follow-up mechanism SA is provided to effect movement of the distributor switch and another to effect movement of the record paper. In addition a follow-up mechanism SB is provided to move the pens transversely across the record paper. Alternatively, both movements might be applied to the record paper with the pens fixed or to the pens with the record paper fixed.

The input to the transmitting coil TC of the delay line is arranged to be of step-function form while the length of each of the receiving coils RC1–RC4 is such that the transmission of such step function through the delay line produces a square-sided output pulse from each receiving coil in turn, each pulse being of a duration equivalent to the range of possible echo times from a region of predetermined thickness, e.g. ¾", of the test object 9. The receiving coils RC1–RC4 are suitably spaced and their respective positions relative to the transmitting coil TC are so adjusted that the pulse from the first receiving coil RC1 opens the first gate circuit G1 to pass echo signals from any flaw present in the first thickness zone, of say ¾ inch, lying nearest to the probe head 22. Similarly the pulses from coils RC2, RC3 and RC4 open their associated gate circuits G2, G3 and G4 in turn to pass echo signals indicative of flaws in each of the succeeding thickness zones of the object. It will be understood that if the axial length of the receiving coils is suitably chosen, their centres will be the correct distance apart if they are placed in contact with one another and through this is a convenient arrangement, it is in no way essential.

The operation of the device is briefly as follows. During the longitudinal movement of the probe head 22, a continuous series of ultrasonic test pulses is emitted by the transmitter element and corresponding echo pulses are received by the receiver element from the upper and lower boundary surfaces of the test object and from any flaws present within the thickness of the object. By the gating action of the pulse outputs from the coils RC1–RC4, such flaw-indicating echo signals are selected and separated into four groups corresponding respectively to four successive thickness zones of the object. These groups are applied respectively to the four amplitude-discriminator and storage circuits AD1–AD4. In each of the latter, the incoming signals are subjected to amplitude discrimination whereby the number of the brushes in any group B1–B4 which become energised is a measure of the maximum amplitude signal applied to the circuit and hence is a measure of the size of the flaw.

The switch DS may be arranged to operate through one complete switching cycle, i.e. one revolution, for each inch of movement of the probe head. Upon connection by such switch of the brushes B1 of the first circuit AD1 to the marker styli PS1–PS4, one or more dots will be marked on the record paper TP as shown, for example, at a1 in Fig. 11. Subsequently the switch operates to connect the brushes B2 of the second circuit AD2 to said styli. By this time the paper TP has been moved relatively to the styli whereby a second marking is made as shown at a2 in Fig. 11. Similarly the connection with the brushes B3 and B4 of the third and fourth circuits AD3 and AD4 provides third and fourth markings as shown at a3 and a4. Thus each group of markings resembles a miniature type-A display of the conditions of a defined zone of the test object which with the assumption made would have an area of 1" x ¼". The cycle of operations is repeated for each one inch of movement of the probe head 22 along the length of the object to provide a first series of aligned marking groups I as shown at b, c . . . Fig. 11. At the end of its first longitudinal scanning movement, the probe head is shifted transversely and the direction of movement is reversed. Simultaneously, the styli PS1–PS4 are likewise moved transversely relatively to the paper TP to produce a second series of parallel marking groups II and so on. Conveniently the circuits AD1–AD4 are so adjusted that the pen PS4 is always energised to provide a series of four dots constituting a datum line for each marking group. Alternatively a further continuously energised contact and associated stylus can be used.

The arrangement described thus ensures that a trace of the type shown in Fig. 11 shall be obtained which represents a picture of the flaws encountered in the test object. The different groups of dots correspond to different positions along the length of the test object but within each group the dots represent different depths. It will be seen that in each row representing a traverse, a group of four markings is produced and these serve as a datum line, the lowest level of the amplitude discriminators being arranged so that these traces are produced in any event. They do not, of course, represent the presence of flaws or, at any rate, only of flaws so minute that their presence can be disregarded.

Owing to the effect of the delay line, the different dots in the longitudinal direction represent different echo times and hence the depth in the test object at which flaws are discovered. The number of dots in a transverse direction gives a general indication of the severity of the flaws since they are dependent upon the amplitude of the echo signal received as analysed by the amplitude discriminators. Thus, from Fig. 11, it will be seen that a number of flaws, some of them quite severe, are detected during the first traverse represented by the line I but only one of them is found in the line II and no serious ones in any of the other lines.

Considering now the two monitor oscilloscopes, AS giving the so-called A-type presentation has its X deflecting plates supplied from the time base TB while the Y-deflecting plates are fed by the amplifier LA with the echo signals obtained. This means that a trace is produced horizontally across the face of the oscilloscope with a marked deflection at the end representing the boundary echo. If any flaws are discovered as a result of that particular pulse, a deflection will occur at an intermediate point which will give an indication of the depth of the flaw and its severity. The actual location of the flaw in the test object cannot, however, be readily estimated from this presentation except by observing the position of the probe at the time it is displayed.

The B-type oscilloscope BS as indicated has the time base connected to the Y deflection plates while a potential is connected to the X deflection plates from a potentiometer P driven by the follow-up mechanism SA corresponding to the main longitudinal traverse. In this case the echo signal is fed to the grid of the tube and thus controls the brightness of the display. With this arrangement a form of rectangular plan position indication is given, the horizontal dimension representing the length of the specimen and the occurrence of bright spots in the vertical direction indicating the position of flaws which have been discovered. There will, in any event, be a bright line at the bottom of the display corresponding to the boundary echo. The provision of these two oscilloscopes is not essential to operation of the recording equipment but simplifies the initial setting-up and subsequent supervision of the working and may enable the tests to be carried out with greater efficiency.

Referring now to the circuit diagram of Fig. 10, this shows one of the receiving coils, for instance, RC1 on the delay line DL and the signal obtained therefrom is passed to the high slope pentode valve V1 serving as a gate amplifier. As already mentioned, the transmitting coil TC is energised by applying a step function of current thereto and this produces a stress wave approximately equal to the length of the transmitting coil. This wave travelling along the line enters the receiving coil RC1 and produces a square voltage wave which is positive while the stress wave is entering the coil and reverses to negative when it commences to leave. This wave is amplified and inverted by V1 and the positive portion is suppressed by the rectifier valve V5. The signal from the linear amplifier LA, Fig. 9, comprising a damped train of waves is applied by way of a rectifier MR1 to the pentode valve V2. The rectifier serves to convert the signal into a signal positive pulse which is amplified and inverted by the valve V2. The signal is then passed to a plurality of circuits each identical with that shown constituting the different gate circuits G1, G2, G3 and G4. Each gate circuit comprises a double triode consisting in effect of two cathode followers in parallel, sometimes known as a long-tailed pair. The two valves V3 and V4 have their anodes connected together and their cathodes connected to earth by way of a common resistor R1. The signal is applied by way of capacitor C1 to the grid of the valve V3 and the control from the gate is applied to the grid of the valve V4, these grids being also connected over the resistors R2 and R3 to a suitable positive potential. It will be readily followed that, with suitable choice of the components, the negative signal only alters the cathode potential appreciably if negative potential is applied to the other grid at the same time from the gate circuit.

This variation in cathode potential is applied to the four stages of the amplitude discriminator, one of which is shown in the lower portion of Fig. 10. Since the echo signal is very short, it is convenient in order to obtain sufficiently high voltage to operate the recorder to incorporate a pulse lengthening device. This ensures that the effect of the very short signals obtained from the echoes shall persist for long enough to produce an appreciable charge of the storage capacitor which effects the marking of the Teledeltos paper. The circuit illustrated, sometimes known as a Schmitt trigger circuit, is a monostable multivibrator comprising the triodes V8 and V9. The diode V6 performs the amplitude discrimination under the control of the variable resistor RV1 which determines the point at which V6 shall conduct. The setting of the variable resistor RV2 which controls the potential of the grid of V8, determines the threshold value of the pulse lengthener. The operating time of the trigger circuit, which is the time during which V9 is non conducting and hence capacitor C3 is charging through rectifier MR2, is mainly determined by the values of capacitor C2 and resistor R4. The inductance L1 aids this charging operation and the diode V7 serves to define more accurately the initial potential of the grid of V9. Capacitor C3 comprises the storage device which when charged serves for the marking of the Teledeltos paper by way of the associated stylus.

Various modifications can clearly be made without departing from the scope of the invention. For instance, the number of depth zone divisions can be increased or decreased by altering the number of gate circuits G and their associated elements while the definition of flaw size can be altered by change of the number of amplitude discriminator levels in the AD circuits. A variety of arrangements can be employed instead of that suggested for coordinating the movements of the switch DS and the styli PS1–PS4 with relation to the scanning movement of the probe head. Thus the strip of Teledeltos paper could be arranged to move always in the same direction to give a single basic row of dots in which case there would be no need for the styli to be moved transversely in unison with the traverse displacement of such probe head. Known techniques for signal injection other than that of the "immersion" type mentioned may be employed while the probe head may comprise a single combined transmitter/receiver transducer. If desired, the number of probe heads and associated apparatus elements may be increased so as to deal with a plurality of inspection zones simultaneously. Electronic pulse generators may be employed in lieu of the delay line system described for effecting the selective control of the gate circuits if this seems likely to prove simpler.

Moreover the motor drive circuits may be arranged for two-speed operation so that if operation at high speed has given a general indication of an imperfect zone in an object under test, this zone may then be explored at low speed to determine whether the imperfections are in fact serious.

I claim:

1. A device for detecting and automatically recording flows in an object by means of ultrasonic waves, comprising a probe incorporating at least one electro-acoustic transducer so as to provide a transmitter and a receiver, means for transversing said probe over the object to be tested, a source of pulses of ultrasonic frequency, means for connecting said source to said transmitter, a plurality of gate circuits, means for supplying the output from said receiver to said gate circuits, a timing device for causing said gate circuits to be opened successively in turn in response to each pulse from said source, a like plurality of electrical storage devices operable from said receiver when the associated gate circuits are opened, a recording surface, a recording member co-operating with said recording surface, means for effecting relative movement between said recording surface and said recording member in synchronism with the traverse movement of said probe, and a distributor switch synchronised with the traverse movement of said probe for connecting up said storage devices in turn to said recording member to produce a corresponding record on said recording surface in accordance with the operation of said storage devices.

2. A device for detecting and automatically recording flaws in an object by means of ultrasonic waves, comprising a probe incorporating two electro-acoustic transducers operating respectively as a transmitter and a receiver, means for automatically traversing said probe over the object to be tested, a source of pulses of ultrasonic frequency, means for connecting said source to said transmitter, a plurality of gate circuits, means for supplying the output from said receiver to said gate circuits, a timing device for causing said gate circuits to be opened successively in turn in response to each pulse from said source, a like plurality of electrical storage devices operable from said receiver when the associated gate circuits are opened, a marking device, a web of paper co-operating with said marking device, means for moving said web in synchronism with the traverse movement of said probe, and a distributor switch synchronised with the traverse movement of said probe for connecting up said storage devices in turn to said marking device to produce a corresponding record on said paper web in accordance with the operation of said storage devices.

3. A device for detecting and automatically recording flaws in an object by means of ultrasonic waves, comprising a probe incorporating two electro-acoustic transducers operating respectively as a transmitter and a receiver, means for automatically traversing said probe over the object to be tested, a source of pulses of ultrasonic frequency, means for connecting said source to said transmitter, a magnetostriction delay line, a transmitting coil encircling said delay line, means for supplying said transmitting coil with pulses from said source, a plurality of receiving coils each encircling said delay line and suitably spaced therealong in relation to said transmitting coil, a like plurality of gate circuits respectively operable from said receiving coils, a like plurality of capacitors which are charged when a suitable output from said receiver is permitted to pass through the associated gate circuit, a marking device, a web of paper co-operating with said marking device, means for moving said web in synchronism with the traverse movement of said probe, and a distributor switch synchronised with the traverse movement of said probe for connecting up said capacitors successively in turn to said marking device to produce a corresponding record on said paper web.

4. A device for detecting and automatically recording flaws in an object by means of ultrasonic waves, comprising a probe incorporating two electro-acoustic transducers operating respectively as a transmitter and a receiver, means for traversing said probe over the object to be tested, a source of pulses of ultrasonic frequency, means for connecting said source to said transmitter, a plurality of gate circuits, means for supplying the output from said receiver to said gate circuits, a like plurality of amplitude discriminators respectively connected to the outputs of said gate circuits and each having a plurality of channels, each channel being adjusted to pass a signal of a different predetermined amplitude, a timing device for causing said gate circuits to be opened successively in turn in response to each pulse from said source, a plurality of electrical storage devices one individual to each of said channels of each of said amplitude discriminators, a plurality of marking devices corresponding in number to the number of channels of each amplitude discriminator, a web of paper co-operating with said marking devices, means for moving said web in synchronism with the traverse movement of said probe, and a distributor switch synchronised with the traverse movement of said probe for connecting up said storage devices in turn to said marking devices whereby said marking devices produce on said web an automatic record of the size of flaws encountered during a traverse.

5. A device as claimed in claim 4 in which each of said channels includes a pulse lengthening device which enables the output from said receiver to produce sufficient charging of a capacitor constituting said electrical storage device to effect the operation of said marking device.

6. A device as claimed in claim 3 in which said distributor switch includes means for discharging said capacitors after they have been connected to said marking device.

7. A device as claimed in claim 3 in which the means for traversing said probe over said object comprises means for driving said probe linearly, means for reversing the direction of movement when the end of the object is reached and means for simultaneously moving said probe one step in a direction transverse to its direction of linear movement.

8. A device as claimed in claim 2 including two cathode ray tubes, each of said tubes having two sets of deflecting plates and at least one control grid, connections from the output of said receiver to one of said sets of deflecting plates of one of said tubes, a time base circuit controlled by said pulse source, connections from said time base circuit to the other of said sets of deflecting plates of said one tube, connections from the output of said receiver to said control grid of the other of said tubes so as to control brightness, connections from said time base circuit to one of said sets of deflecting plates of said other tube, a source of potential which varies in synchronism with the traverse movement of said probe, and connections from said source of potential to the other of said sets of deflecting plates of said other tube.

References Cited in the file of this patent

UNITED STATES PATENTS

| 2,280,226 | Firestone | Apr. 21, 1942 |
| 2,740,289 | Van Valkenburg et al. | Apr. 3, 1956 |
| 2,770,966 | Halliday et al. | Nov. 20, 1956 |
| 2,836,059 | Beaujard et al. | May 27, 1958 |

FOREIGN PATENTS

| 696,920 | Great Britain | Sept. 9, 1953 |
| 699,796 | Great Britain | Nov. 18, 1953 |

OTHER REFERENCES

Publication, Electronics, December 1947, pp. 102–105.